Figure 9:
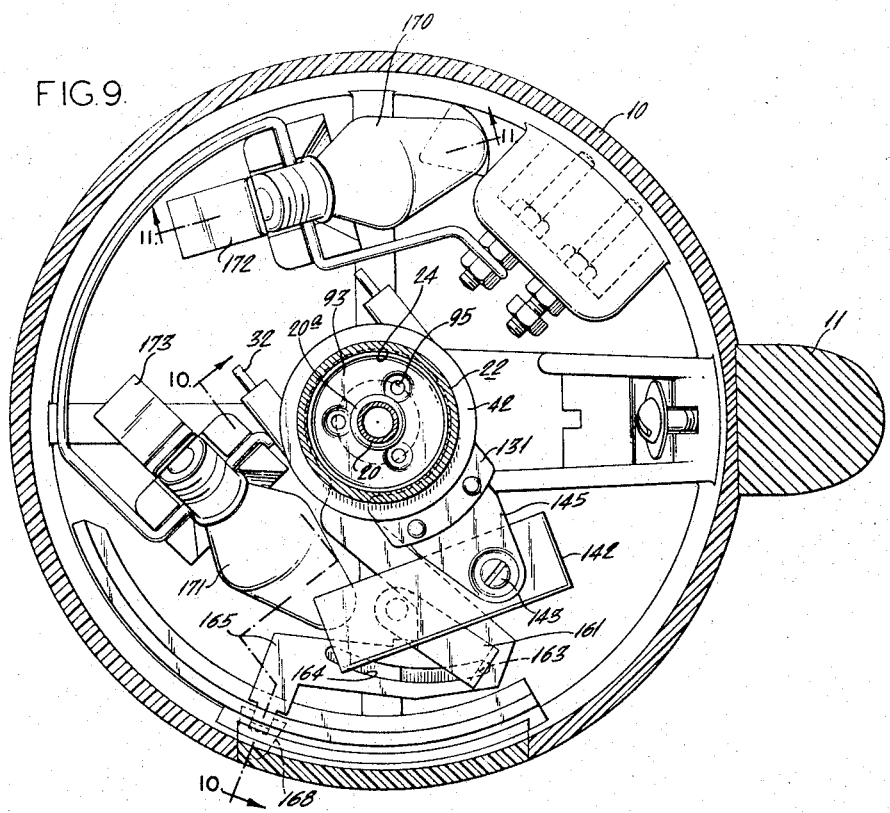

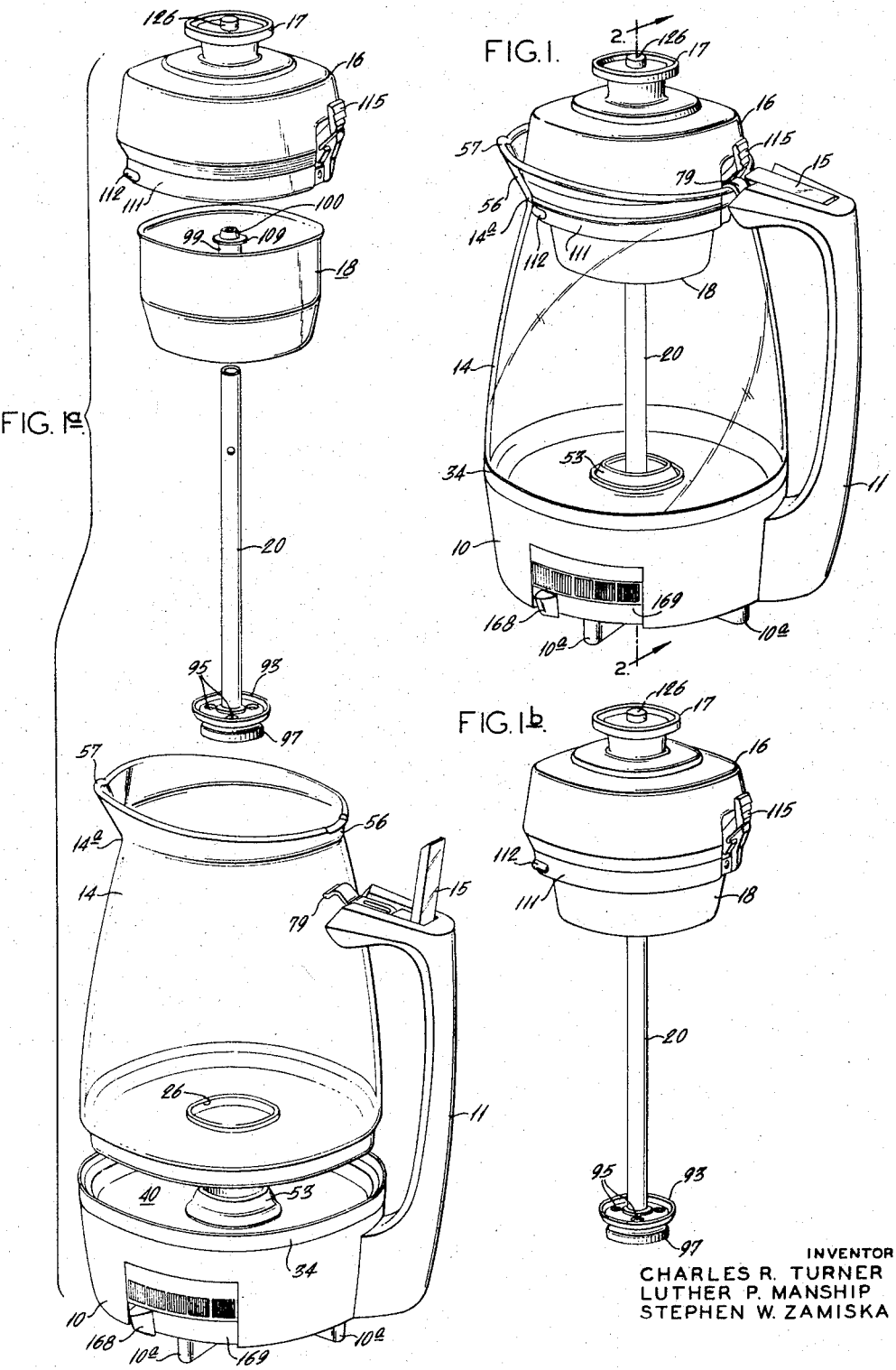

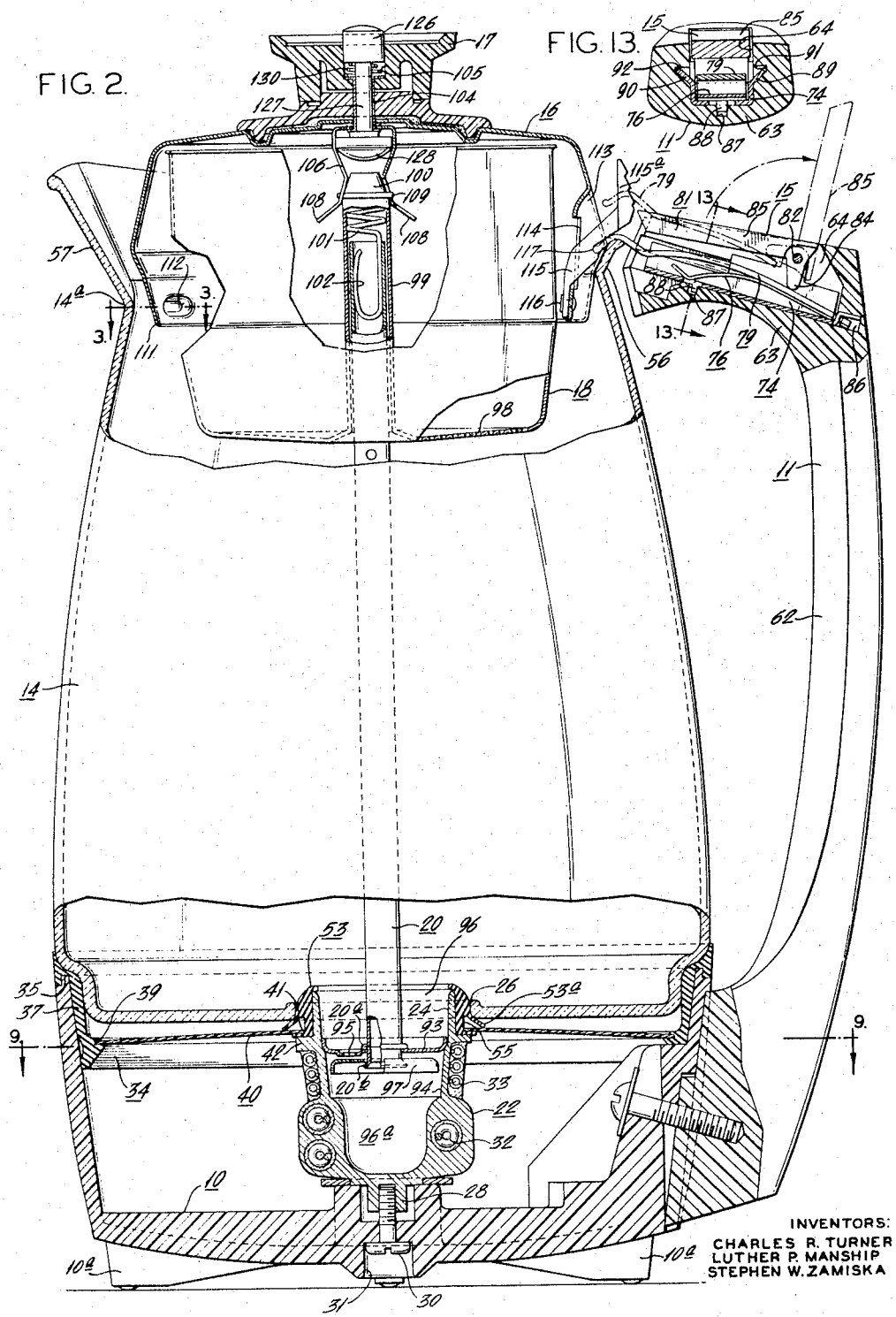

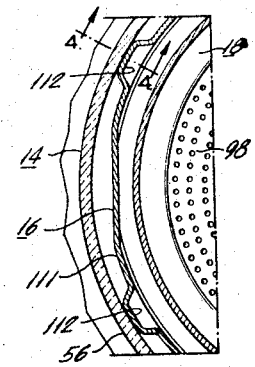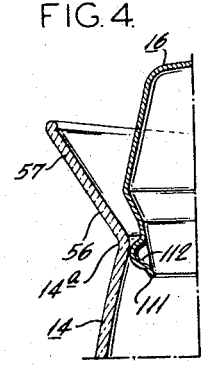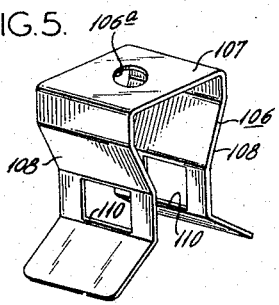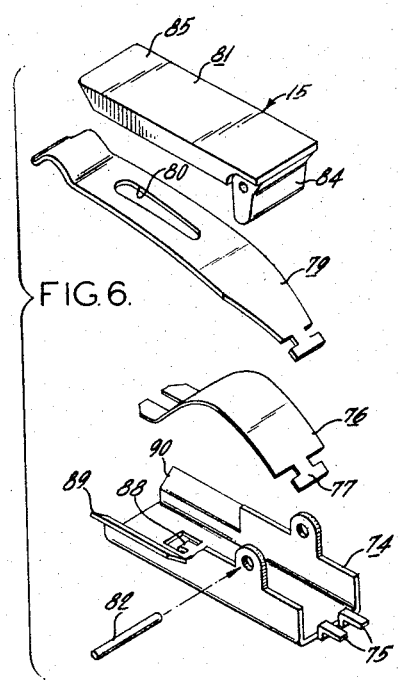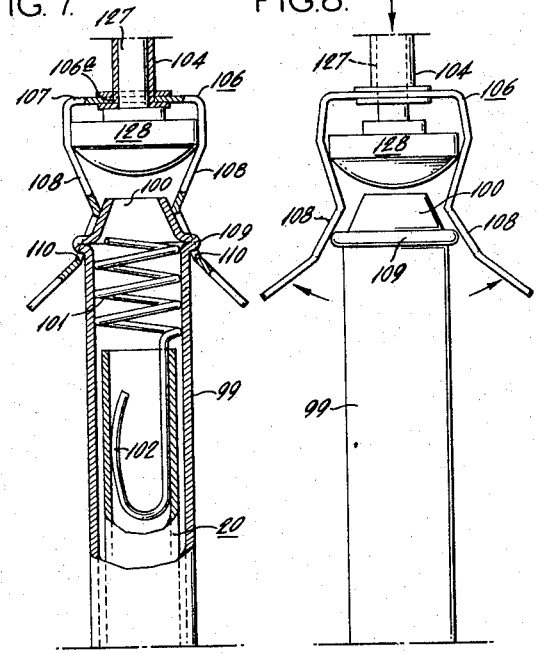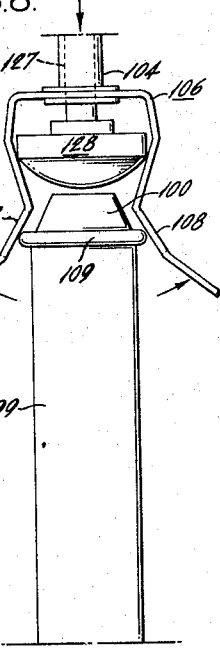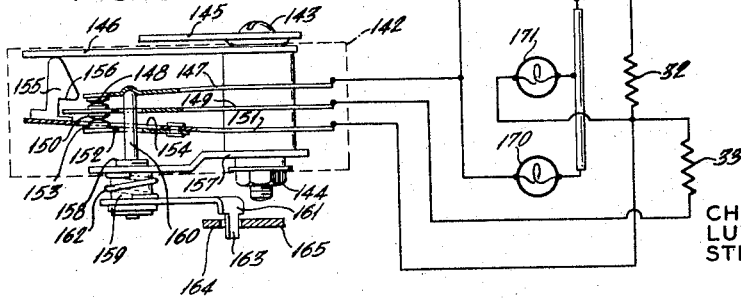

July 25, 1967 L. P. MANSHIP ET AL 3,333,087
THERMOSTATICALLY CONTROLLED ELECTRIC PERCOLATOR
Original Filed July 31, 1964 4 Sheets-Sheet 4

INVENTORS
CHARLES R. TURNER
LUTHER P. MANSHIP
STEPHEN W. ZAMISKA

United States Patent Office 3,333,087
Patented July 25, 1967

3,333,087
THERMOSTATICALLY CONTROLLED ELECTRIC PERCOLATOR
Luther P. Manship, Collingdale, and Charles R. Turner and Stephen W. Zamiska, Philadelphia, Pa., assignors to The Proctor-Silex Corporation, Philadelphia, Pa., a corporation of Connecticut
Original application July 31, 1964, Ser. No. 386,527, now Patent No. 3,282,196, dated Nov. 1, 1966. Divided and this application Oct. 22, 1965, Ser. No. 510,116
9 Claims. (Cl. 219—442)

This application is a division of copending application, Ser. No. 386,527, filed July 31, 1964, entitled, "Coffee Percolator," and now Patent No. 3,282,196, granted Nov. 1, 1966.

This invention relates to coffee brewing apparatus, and more particularly to improvements in the construction of electric coffee percolators.

It has long been recognized that the brewing of coffee in a metallic vessel may result in the development of a certain measure of rancidity due to a tendency for natural organic acids to react with the metal. To guard against off-flavors, and also for aesthetic reasons, the use of a glass container has become increasingly popular, particularly for coffee makers of the drip or vacuum type. An attempt to use glass in the construction of electric percolators has encountered special problems, one of which is the need for a leak-proof seal between the glass container and the metallic member supplying heat for the percolating operation. The prior art includes a number of proposed arrangements using glass or ceramic containers. In general, these prior art arrangements comprise an externally threaded extension of the walls defining a heat pump well, which extension projects upward into the interior of the container. A nut is arranged to be screwed downward on the threaded extension to bind the bottom of the container against a horizontal face, with one or more gaskets positioned therebetween. When assembled in this manner, the container and the base are inseparable in normal use, requiring the handling of the whole percolator as cleaning is required. If, in such handling, the container should be broken, replacement is not easy since it requires special facilities for loosening the nut and for properly reassembling the percolator with new parts. It is an object of this invention to provide a percolator having a container that may be removed easily for cleaning and that may be quickly installed in sealed relationship with the heat pump.

Another problem with percolators of this type is in the arrangement of the thermostatic switch control. In some cases the thermomotive member has been placed in contact with the bottom of the glass container. When this is done, the response to temperature changes in the body of the liquid is slow, because of the thermal insulating qualities of the glass, and, should there be no liquid present, the temperature of the heat pump may increase to a value that can cause damage to the gasket between the heating means and the container. In other cases, the thermomotive member is responsive only to the temperature of the heat pump. This arrangement will prevent overheating but it cannot sense the temperature of the liquid in the container and is therefore unsatisfactory. It is another object of the invention to provide an arrangement whereby a single thermostatic switch is quickly responsive to the temperature of the liquid in the container and also serves to disconnect the heating elements if the temperature of the heating means rises to an undesirable level.

It is a further object of the invention to provide a percolator wherein the coffee grounds basket, the fountain tube, and a removable lid can be handled as an interconnected unit.

Figure 11:
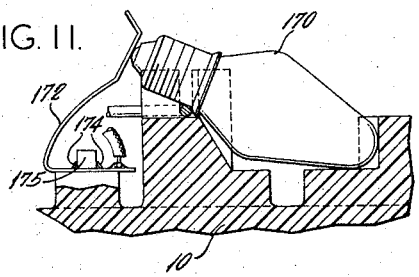
Figure 10:
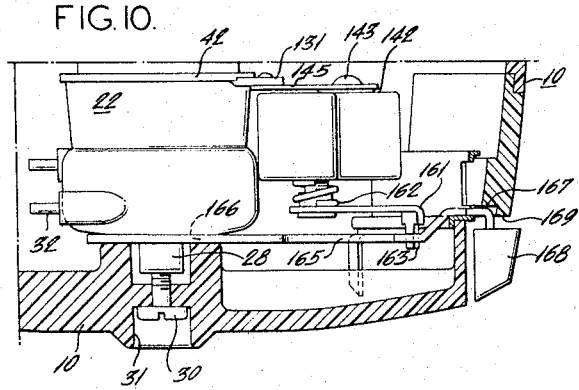

These and other features of novelty will be apparent from the following description with reference to the attached drawings in which:

FIGURE 1 is a perspective view of the coffee percolator embodying the present invention;
FIGURE 1a is an exploded perspective view similar to FIGURE 1;
FIGURE 1b is a perspective view of a portion of the apparatus of FIGURE 1;
FIGURE 2 is a sectional view taken along line 2—2 of FIGURE 1 with the electrical parts in the base omitted;
FIGURE 3 is a fragmentary sectional view taken along line 3—3 of FIGURE 2;
FIGURE 4 is a fragmentary sectional view taken along line 4—4 of FIGURE 3;
FIGURE 5 is a perspective view of the clasp member of the apparatus of FIGURE 1;
FIGURE 6 is an exploded perspective view of latch structure used to maintain the coffee percolator assembled;
FIGURE 7 is a sectional view of the clasp member and related structure for holding the tube of the coffee basket with the coffee basket secured to the fountain tube;
FIGURE 8 is an elevational view similar to FIGURE 7 with the legs of the clasp member actuated away from engagement with the tube of coffee basket;
FIGURE 9 is a sectional view taken along line 9—9 of FIGURE 2;
FIGURE 10 is a fragmentary sectional view taken along line 10—10 of FIGURE 9;
FIGURE 11 is a fragmentary sectional view taken along line 11—11 of FIGURE 9;
FIGURE 12 is a schematic circuit diagram illustrating the circuit employed in the present invention; and
FIGURE 13 is a sectional view taken along line 13—13 of FIGURE 2.

Referring to FIGURES 1 and 1a, the percolator comprises a generally cylindrical, hollow cup-shaped base generally designated 10, preferably moulded with integral feet 10a of phenolic resin, and having a separate handle 11 of similar material rigidly secured to the base and extending upwardly from one side thereof. Container 14, preferably constructed of heat-resistant glass, is nested within the lip of base 10 and is clamped on the base by latch means, generally designated 15, in the upper portion of handle 11. The glass container 14 is provided with an inverted cup-shaped sheet metal lid 16 surmounted by a knob 17, preferably of a moulded resinous material. The lid 16, which nests within the divergently upwardly flared collar of the glass container, encloses the lip and top portion of a coffee basket 18 located in the conventionally cup-shaped glass container. Fountain tube 20 extends downwardly from the coffee basket 18 to the base 10.

As can be seen in FIGURE 2, a cup-shaped heat-pump well 22 is centrally positioned in the base. The upper lip of the well provides a collar 24 which extends upwardly into container 14 through aperture 26 centrally located in the bottom of the glass container. The bottom of well 22 has a downwardly extending stud 28 which enables it to be secured to the bottom of base 10 by screw 30. Stud 28 has an internally threaded bore to accommodate screw 30, which passes upwardly through counterbore 31 in the bottom of the base 10. Two resistance heaters 32 and 33 are incorporated respectively in and around the side walls of well 22 and are electrically insulated therefrom but in heat-transfer relationship with well 22. Primary heater 32 is adapted to perform the percolating operation and secondary heater 33 is provided to maintain the brewed coffee at a predetermined temperature after percolation is completed. A rubber ring 34 of irregular cross section fits over a thin annular extension 35 atop the lip of base 10. A portion 37 of rubber ring 34 extends downwardly into the base along its sidewalls. The lower end of portion 37 is shaped to form a horizontally disposed annular slot 39 into which the outer edge of a transluscent flexible disc 40 is snapped. Disc 40 has a central circular opening 41 which is positioned to permit disc 40 to slip over the upper end of collar 24 around well 22. The edge of disc 40 bounding the well 22 seats on annular flange 42 of well 22 and the outer periphery of disc 40 is pressed downwardly over rubber ring 34 and into slot 39 where it is held in a leak-tight relationship.

An annular rubber sealing member 53 fits snugly over collar 24 and against flange 42. Sealing member 53 also provides a flap 53a which overrides and seats on the upper face of disc 40. The outside of sealing member 53 together with flap 53a is of generally conical form. Preferably, sealing member 53 includes behind flap 53a an annular recess 55 to provide maximum resilience.

Glass container 14 has an outward step near its bottom which permits its seating in base 10 and the container tapers to a smaller diameter neck 14a near its open top. Above the neck 14a the container flares outwardly in a collar 56 that broadens from a narrow width at the point of engagement of latch 15 to a pouring lip 57. The outward step in the bottom of glass container 14 is adapted to fit snugly over ring 34. Because of the relative shaping and proportions of the parts, the outside of the percolator from the glass container 14 through sealing ring 34 and base 10 presents a substantially smooth surface.

In assembling the percolator, the stepped bottom section of glass container 14 is pushed downwardly within ring 34 so that the inner edge of aperture 26 in the bottom of container 14 engages the tapered outer diameter of sealing member 53. A liquid tight seal is formed between these parts by downward pressure on container 14, created by latch means 15, which will now be described in detail.

Handle 11 provides a generally vertically extending hand grip portion 62 terminating in a generally horizontal extension 63 which extends inwardly toward container 14. Extension 63 is longitudinally grooved to provide a recess 64 in the top thereof arranged to receive latch means 15. As can be seen more clearly in FIG. 6, latch means 15 is assembled in a generally channel-shaped bracket 74, which includes a pair of spaced tongues 75 extending lengthwise from one end of the bracket. A leaf spring 76 is provided having grooves near one end thereof forming a T-shaped end portion 77 adapted to fit between tongues 75 to serve as a hinge. The body of the leaf spring is curved upwardly when its free end lies against the bottom of bracket 74. Mounted above leaf spring 76 is a resilient latch arm 79, one end of which is provided with a T-shaped portion, similar to the T-shaped portion of leaf spring 76, to serve as a hinge when fitted between tongues 75. The free end of latch arm 79 is in the form of a hook arranged to fit over the collar 56 of container 14. The latch arm has a central longitudinal narrow opening 80 to reduce its cross-section for added resilience.

Positioned above latch arm 79 is a generally L-shaped lever 81 mounted in bracket 74 by means of a pivot pin 82 which extends between vertically upstanding ear extensions formed above each side of the bracket. The short lever arm 84 of the L-shaped lever has indented sides to fit between the vertically extending ear extensions of bracket 74, and serves as a cam to engage the upper face of latch arm 79 and to thereby force downwardly atop the top edge of collar 56 the hook portion of latch arm 79 into resiliently firm engagement with the collar of container 14. This is done against the upward bias provided by the curved portion of leaf spring 46. The latch is operated by manually rotating long lever arm 85 of the L-shaped lever 81 about its pivot 82. When the free end of lever arm 85 is pushed downwardly leaf spring 76 is compressed and resilient latch arm 79 is bent downwardly at a point intermediate its pivotal connection and its free end. At the limit of its travel, short lever arm 84 passes overcenter so that the latch arm is maintained in its locking position. When the free end of lever arm 85 is lifted, the pressure on the latch arm is released and leaf spring 76 lifts the portion of hook latch arm 79 away from engagement with the collar of container 14.

Since all of the operating parts of the latching means are attached to bracket 74, they form a self-contained assembly which may be mounted into the recess in the handle as a unit. As can be seen in FIGURE 2, grooved recess 64 is of a size to receive the latch means and has a narrow longitudinally extending opening 86 in line with the bottom of the recess to receive the tongues of the bracket and a blind hole 87 in its bottom in extension 63 at 90° to the plane of the bracket adapted to receive an integral downwardly turned lip 88 of the bracket. As shown in FIGURE 13, outwardly projecting portions 89 and 90 of the sides of the bracket 74 resiliently snap into grooves 91 and 92, respectively, opening out from the channel side walls as the channel bracket 74 is slid into grooved recess 64. The bracket and its associated parts are thereby held against displacement in any direction.

In assembling the percolator for use, latch lever arm 85 is pivoted upwardly, thereby releasing pressure on latch arm 79. Glass container 14 is then installed by fitting its bottom into the sealing ring 34 at the base 10 so that its collar underlies the hook portion of latch arm 79. The free end of lever arm 85 is next pressed downwardly to the extent of its travel, whereby latch arm 79, presses the container downward into sealed relationship with ring 34 and sealing member 53. This must be done before the internal parts of the percolator are placed in container 14, for reasons that will be explained hereinafter.

The fountain tube 20 is provided with a cupped disc 93 with upturned lip secured to annular shoulder 20a near the lower end of the fountain tube, the disc 93 being of such diameter that it will pass through the upper end of collar 24 into well 22 and seat against a beveled surface 94, as shown in FIGURE 2. Apertures 95 are arranged through disc 93 to permit liquid from upper chamber 96 to enter the lower chamber 96a of member 22. A smaller diameter circular valve disc 97 with downturned edges is loosely mounted beneath disc 93 adapted to slide along tube 20 between disc 93 and annular shoulder 20b to close the apertures 95 when pressure is developed within well 22.

A coffee basket 18, having a perforate bottom 98, is provided with a centrally located upstanding tube 99 adapted snugly to accommodate the upper end of fountain tube 20. The top portion 100 of tube 99 is swedged inwardly to act as a stop to position the upper end of a coil spring 101, which must be inserted upwardly from the bottom into tube 99. Spring 101 includes at least one coil of greater diameter in relaxed condition than the inside diameter of tube 99, serving to grip the inside walls of the tube to hold the spring tightly in place. The lower end of spring 101 is provided with a downwardly extending elongated hair pin loop 102, adapted to enter the upper end of fountain tube 20 and by its resilience bear against its inside walls to support the weight of tube 20 through frictional engagement therewith and thereby to hold the fountain tube 20 in the proper position against beveled surface 94.

Glass container 14 is provided with removable sheet metal lid 16 in the form of an inverted cup. The knob 17 is secured to lid 16 by means of a tubular rivet 104 which extends through an axially disposed bore in the knob. The upper flange of rivet 104 seats against the bottom of a concentric bore 105 in the top of the knob 17, and the lower flange of rivet 104 seats against a bifurcated resilient clasp member 106 located as shown in FIGURE 2 against the under face of the lid riveting together the knob 17, and the lid 16 and clasp 106. The tubular rivet passes through opening 106a in the base 107 of the clasp member 106 shown in detail in FIGURE 5.

Each finger 108 of clasp member 106 taken with base 107 forms a generally elongated S-shape, one being opposed to the other in a symmetrical arrangement. The distance between the free ends of the fingers 108 of the clasp member is greater than the diameter of the tube 99 of the coffee basket, which tube includes a radially outwardly extending ring flange 109 formed adjacent its tapered upper end. The closest spacing between the S-shaped fingers 108 of the clasp member is less than the diameter of ring portion 109, but from this point the fingers 108 diverge toward their free ends. After coffee basket 18 has been filled with ground coffee, lid 16 is pressed downward over the top of the basket. As the divergent portions of fingers 108 of clasp member 106 contact the tapered end of tube 99, their resilience permits them to be forced apart until the ring flange 109 lies within or above (toward its base 107), the level of minimum distance between the fingers. The ring 109 is thus resiliently gripped by the clasp member. Preferably portions of flange 109 enter slots 110 in fingers 108 to clamp securely, mechanically as well as frictionally, tube 99 to the clasp member, as shown in FIGURES 2 and 7. The fountain tube 20 is then telescoped into tube 99 by pushing it upward until hair pin loop 102 of spring 101 enters the open end and retains tube 20. These interconnected parts, lid 16, basket 18 and tube 20, as shown in FIGURE 1b, may be lifted by means of knob 17 and positioned in container 14 to seat disc 93 in the heat pump well 22. Spring 101 yields to pushing the lid downwardly against its bias until the inwardly beveled lip 111 of the lid seats against the matching bevel of the collar 56 of container 14. When the lid is seated, a pair of spacers 112 in the form of protrusions embossed in lip 111 of lid 16, as seen in FIGURE 3, are in a position to fit beneath neck 14a of the container and thereby cooperate with the latch member, to be described hereinafter, to hold the lid 16 in place. The spacers also serve to permit coffee to be poured between the container and the lid with the lid in place by spacing the lid from collar 56 in the region of lip 57, as seen in FIGURE 4.

At a point generally opposite spacers 112, the side wall of lid 16 is inwardly deformed to provide a vertically extending recess 113, including an elongated aperture 114 within and at the bottom of the recess. A generally S-shaped latch member 115, which may be of moulded resinous material is mounted in recess 113 to extend through the aperture 114. One end of latch member is attached by screw or rivet 116 to the lip of the lid below the aperture 114 behind recess 113 within the lid. The mounting of latch member 115 causes the middle transverse section to extend through aperture 114 and terminate in a thumb piece extending parallel to the other end in its generally upwardly projection. The thumb piece 115a is grooved for non-slip thumb engagement and may be pressed while the hand grips handle 11. The intermediate transverse portion of latch member 115 has an upwardly opening groove 117 positioned to receive the downwardly directed tip of the hooked end of latch arm 79. Groove 117 is so located that when lid 16 is pressed downwardly, the lower portion of the latch member below groove 117 engages the free end of latch arm 79 which urges latch member 115 by wedge or camming action away from latch arm 49, due to the flexibility of the lower portion of the latch member and the portion of the lid supporting the latch member until the end of latch arm 79 snaps into groove 117. Groove 117 is an exaggerated shoulder against which the end of latch arm 79 abuts as a stop so that any shoulder and stop providing a downward force component would serve the same function. The latch member cooperates with spacers 112 to hold the lid in a position where spring 101 is partially compressed so as to cause disc 93 on the lower portion of the fountain tube to seat firmly against beveled surface 94 of the heat well as well as providing resilient reaction force against the stop afforded by the end of latch arm.

After the lid is positioned, as described above, the L-shaped lever 81 is inaccessible and cannot be disengaged readily since its sides are within recess 64 and its end is too close to thumb piece 115a of latch member 115. This guards against inadvertent release of latch means 15 while the percolator is in use.

For cleaning the glass container, the thumb piece 115a of latch member 115 is pushed away from latch arm 79 until the end of the latch arm 79 is released from and clears recess 117. The lid, coffee basket and fountain tube assembly of FIGURE 1b may then be lifted out by knob 17.

Slidably mounted within bore 105 of knob 17 is a push button 126 which is integral with a rod 127 which extends through tubular rivet 104. A button 128 with a rounded lower face is attached to the lower end of rod 127. Button 128 in its upper rest position fits snugly between generally parallel portions of fingers 108 of clasp member 106. Between the push button 126 and the bottom of bore 105 is a spring 130 which normally biases the push button and its attached parts upwardly into the rest position shown in FIGURES 2 and 7. To separate basket 18 from lid 16, as shown in FIGURE 8, the push button is pressed against the bias of spring 130 which moves disc 128 downwardly against portions of the fingers 108 which converge to the narrowest portion of the spacing between the fingers and thereby forces apart the fingers 108. As fingers 108 are forced apart they release their grip on flange 109 and tube 99 of the coffee basket 18, as shown in FIGURES 7 and 8.

Once the lid has been removed from container 14, the free end of lever 81 is accessible. When the arm 85 is lifted, leaf spring 76 raises latch arm 79 away from engagement with the top rim on container 14 and the container may be lifted from base 10. Before this is done, however, the container should be emptied to avoid any substantial flow of liquid through aperture 26 in its bottom when it is separated from sealing member 53. Any liquid that remains will be caught by disc 40, which with its seal prevents the liquid from contacting the electrical parts in the base.

Immediately beneath flange 42 of cup-shaped well 22 a horizontally extending bracket 131 is provided, as shown in FIGURES 9 and 10, for the mounting of a thermostatic switch assembly, generally designated 142, all of the operative parts of which are held together by a bolt 143 and a nut 144, as shown in FIGURE 12. Plate 145 is secured to bracket 131 by means of screws or other suitable means. Referring to FIGURE 12, showing the details of the switch assembly, a bimetallic member 146 is held in good thermal communication with plate 145 through suitable thermal conductive means by bolt 143, and switch blades and a bracket 157 are stacked beneath the bimetallic member, separated from the bimetallic member and from each other by similar annular electrical insulating means through which bolt 143 passes at the same time passing through holes in the switch blades large enough to avoid electrical contact. The switch blades include a first resilient, conductive switch blade 147 carrying a contact 148, a second resilient, conductive switch blade 149 carrying a double faced contact 150 positioned to contact contact 148 and a third resilient, conductive switch blade 151. A short bimetallic blade 152 is secured under blade 161, and has a contact 153 mounted on top of its free end in position to contact contact 150 through aperture 154 in blade 151. The free end of blade 151 projects beyond contacts 150 and 153 and supports an insulating post 155 which extends upward to engage bimetallic member 146. The insulating post 155 has an under-cut providing a shoulder overlying the extended free end of blade 149 which under certain conditions limits the approach of contact 150 toward contact 148. Blade 147 does not extend as far as post 155. Blade 149 is arranged to be engaged by shoulder 156 of insulating post 155 when bimetallic member 146 is bowed downward pressing the post 155, and hence blade 151, downward. Bracket 157 beneath the switch blades has a threaded aperture 158 adjacent its free end which receives adjusting screw 159. Adjusting screw 159 supports and provides axial position adjustment for an insulating rod 160 which projects upwardly through apertures in blades 149, 151 and 152 and engages blade 147. Secured to adjusting screw 159 is an adjusting arm 161 biased downwardly by a coil spring 162, which extends between arm 161 and bracket 157. The free end of arm 161 is provided with a downwardly extending tab 163 which functions as a cam follower in cooperation with cam slot 164 in which it rides in lever arm 165, as seen in FIGURE 9. Cam-providing lever arm 165, as shown in FIGURES 9 and 10, is of irregular shape provided with bearing means to permit its rotation about the axis of the percolator in the form of a circular hole 166 near one end serving as the bearing, which is arranged to rotate around the lower reduced diameter portion of the well 22 possibly with part of the structure resting on base 10. The other end of lever arm 165 extends through a horizontally extending slot 167 in the cap sidewalls of base 10 and supports a knob 168 positioned in a recessed portion 169 in the exterior of base 10. Manual movement of knob 169, and hence lever arm 165, along horizontal slot 167 rotates lever arm 165 about the chamber 22 on the axis of the system. Because of the engagement of tab 163 in cam slot 164, rotation of lever arm 165 causes adjusting arm 161 to rotate and thereby rotates adjusting screw 159, as shown in FIGURE 12. Since screw 159 is threaded into bracket aperture 158, such rotary movement causes rod 160 to move up or down, depending on the direction of rotation, and the engagement between the end of rod 160 and blade 147 causes contact 148 to follow this vertical movement. Blade 149 is biased in such manner that contacts 148 and 150 are normally in engagement, and adjustment of the position of blade 147 does not separate these contacts. Blade 152 is biased toward blade 149, so that contacts 150 and 153 are normally in engagement. However, when blade 147 is adjusted upward, the resultant upward movement of blade 149 tends to reduce the pressure between contacts 153 and 150, which serves as an adjusting means to regulate the temperature at which these contacts open, to be described later.

As shown in the schematic circuit diagram in FIGURE 2, one end of primary heater 32 is connected to line terminal L1 and the other end of the primary heater is connected to blade 151. Line terminal L2 is connected to blade 147, the terminals being connectable to a source of power. Since the contacts are all initially biased into engagement with each other, the primary heater is energized when the percolator is plugged in, the circuit extending from line terminal L1 through heater 32, contacts 153, 150 and 148 to line terminal L2. Secondary heater 33 is, at first, in a shunt circuit, and carries a negligible amount of current because of its relative high resistance compared with primary heater 32.

As previously described, fountain tube disc 93 is seated against beveled surface 94 in well 22, which divides the well into a lower chamber 96a and an upper chamber 96. Heat from primary heater 32 tends to vaporize liquid in chamber 96a and thereby cause percolation. However, the liquid in upper chamber 96 is substantially at the temperature of the balance of the liquid in container 14 since it is in unrestricted conductive communication therewith. Since the thermostatic switch is attached to a well 22 at a point adjacent chamber 96, bimetallic member 146 is in position to sense the temperature in chamber 96, which is representative of the body of liquid in container 14. As its temperature rises, the free end of bimetallic member 146 moves downwardly and presses on post 155 which moves blade 151 downwardly until contact 153 separates from contact 150. The temperature at which this occurs is determined by the setting of the adjusting means previously described. The opening of contacts 150 and 153 stops the percolation process and causes secondary heater 33 to be fully energized to keep the brew warm, the circuit extending from line terminal L1 through heater 32, heater 33, and contacts 150, 148 to line terminal L2.

Bimetallic blade 152, which supports contact 153, is heated by the passage of current therethrough, when contacts 150 and 153 are in engagement. Bimetallic blade 152 is oriented in such manner that, when it cools as a result of a separation of contacts 150 and 153, it will move in a direction to increase the gap between these contacts. When the percolator has been disconnected for serving coffee or for any other purpose and is again plugged in, the secondary heater will be reenergized, but the action of bimetallic blade 152 will prevent repercolation unless the time interval has been so long that the temperature of the brew has dropped approximately 30° F. This is an important feature, since recycling of already brewed coffee through spent grounds is undesirable.

Should there be no liquid in container 14 to absorb heat, the well 22 will rise in temperature which will directly affect bimetallic member 146 causing it to bow downwardly. This will promptly open contacts 150 and 153, and further bowing will cause shoulder 156 of insulator post 155 to engage the free end of blade 149 to separate contacts 148 and 150. In this manner both heaters are deenergized before any damaging temperature is reached. With the arrangement described, a single thermostatic switch is directly responsive to the temperature of the liquid in the container and additionally serves as a disconnect switch to guard against overheating.

As can be seen in the circuit in FIGURE 12 and the sectional view of the base in FIGURE 9, electric lamps 170 and 171 are provided to illuminate the liquid in the glass container 14. As previously described, the flexible disc 40 between the base and the container is made of a translucent material adapted to diffuse the light. The lamps 170 and 171 are mounted within the base, as shown in the sectional view in FIGURE 11, by resilient contacts 172 and 173, respectively, urging the lamps against portions of the base. The resilient contacts 172 and 173 are fastened to upward projections of the base which extends through openings in the contacts with integral tabs of the contacts sheared in the contacts to provide the openings to grip the projections of the base, for example, tabs 174 grip projections 175 of the base which extends through an opening in contact 172 where tabs 174 are bent up. Lamp 170 is continuously lighted as long as the percolater is plugged in. Lamp 171 is lighted as long as contacts 148 and 158 are closed but goes out when these contacts open to disconnect the primary heater.

Although the removable container is described as being made of heat-resistant glass, the invention may be applied to a percolator having a container constructed of any desired material. The foregoing description is merely illustrative and various modifications will occur to persons skilled in the art. It is therefore intended that the appended claims shall cover such modifications as do not depart from the scope and spirit of the invention.

We claim:

1. In an electric percolator, a base, a member mounted on said base including walls defining a heat-pump well, a container for liquid having a bottom with upwardly extending sidewalls and having an opening in the bottom thereof communicating with said heat-pump well, an annular heat within said well spaced from the top thereof, a fountain tube including a disc secured to the bottom thereof adapted to rest on said annular seat, thereby dividing the well into an upper and a lower compartment, a primary electric heater for percolation in heat-transfer relationship primarily with the lower compartment and thermostatic switch means including a thermomotive member connected to said member in direct conductive heat-transfer relationship with said upper compartment, whereby said thermomotive member will sense the temperature of liquid in said upper compartment, which liquid is in unrestricted communication with the balance of the liquid in the container, and said thermomotive member being adapted to deenergize said primary heater when the liquid reaches a predetermined temperature.

2. A percolator in accordance with claim 1, further including a secondary electric heater to keep the liquid warm in heat-transfer relationship primarily with an upper portion of said lower compartment, said primary heater being in heat-transfer relationship primarily with a lower portion of said lower compartment, and circuit means for connecting the primary heater in direct circuit with a source of power and the secondary heater in shunt circuit with the primary heater's connection to the source of power, said thermomotive member at a predetermined temperature flexing to cause the heaters to be connected in series through said circuit means and after further flexing being adapted to deenergize the heaters.

3. A percolator in accordance with claim 2, wherein said thermomotive member is a bimetal and the thermostatic switch means comprises a first and second pair of contacts initially biased toward closed contact position whereby the primary heater is connected in direct circuit and the secondary heater is connected in shunt circuit, and an insulating member adapted to be moved by the flexing of the thermomotive member to separate said first pair of contacts at a predetermined temperature and thereby connect both heaters in series, said insulating member being arranged to separate said second pair of contacts upon further flexing of the thermomotive member to deenergize the heaters.

4. A percolator in accordance with claim 3, further including manual adjusting means for determining the temperature at which said first pair of contacts separate.

5. A percolator in accordance with claim 1, further including a spring arranged to exert downward pressure on said fountain tube to assure firm contact between the fountain tube and said seat.

6. In a coffee percolator, a container, means defining a heap-pump well in the bottom of said container, a fountain tube communicating with said heat-pump well, an electric heater in heat-transfer relationship with said well, thermostatic switch means controlling said electric heater including a pair of contacts and a thermomotive member adapted to move said contacts between open and closed position in response to temperature changes in a liquid in said container, the heating of the thermomotive member causing opening of said contacts and the cooling thereof causing closing of said contacts, and a flexible support member for one of said contacts comprising a bimetallic element adapted to be heated by the passage of current therethrough to flex to close said contacts, said thermomotive member being responsive to increasing temperatures to flex to cause said contact supported by said support member to be opened at a predetermined temperature.

7. In a coffee percolator; a container for liquid; means defining a heat-pump well in the bottom of said container; an annular wall within said well; a fountain tube including a disc secured adjacent the bottom thereof adapted to rest on the wall of the well dividing the well into an upper and a lower compartment; a primary electric heater for percolation in heat-transfer relationship primarily with a lower portion of the lower compartment; a secondary electric heater for keeping the liquid warm in heat-transfer relationship primarily with an upper portion of the lower compartment; and thermostatic switch means including two pairs of contacts supported by at least three flexible support blades insulated from one another such that no more than one contact of each pair is carried on a blade, the pairs of contacts connecting the primary heater in direct circuit with a source of power and the secondary heater in shunt circuit with the primary heater's connection to the source of power, a thermomotive member coupled to the well in direct conductive heat-transfer relationship with the upper compartment to sense the temperature of the liquid, one of the blades including a bimetallic element supporting one of the contacts and adapted to flex to close the one contact, said thermomotive member being responsive to increasing temperatures to flex to open the one contact on the one blade, and an insulating member between said thermomotive member and said one blade and coupled to one of them to cause said one contact to be opened at a predetermined temperature so that the heaters will be connected in series through the other pair of contacts.

8. A percolator in accordance with claim 7 in which the insulating member is provided with a shoulder to engage another of the blades to open said other pair of contacts in response to further heating of the thermomotive member.

9. A percolator in accordance with claim 8 in which the blades are biased into a position holding the contact closed, the percolator further comprising adjusting mean acting on one of said blades for partially relieving the bia closing said contacts to change the temperature at whicl said contacts will be opened.

References Cited

UNITED STATES PATENTS

| 2,076,096 | 4/1937 | Samuels et al. | 99—28 |
| 2,785,276 | 3/1957 | Punzak | 99—310 |
| 2,817,743 | 12/1957 | Foster | 219—43 |
| 2,956,136 | 10/1960 | Schwaneke. | |

FOREIGN PATENTS

| 512,958 | 9/1939 | Great Britain. |

ANTHONY BARTIS, *Primary Examiner.*